United States Patent [19]
Bell

[11] Patent Number: 5,500,194
[45] Date of Patent: *Mar. 19, 1996

[54] HYBRID LOW $NO_x$ PROCESS FOR DESTRUCTION OF BOUND NITROGEN COMPOUNDS

[75] Inventor: Ronald D. Bell, Beaumont, Tex.

[73] Assignee: Petrocon Technologies, Inc., Beaumont, Tex.

[ * ] Notice: The term of this patent shall not extend beyond the expiration date of Pat. No. 5,224,334.

[21] Appl. No.: 237,695

[22] Filed: May 4, 1994

[51] Int. Cl.⁶ ........................................ B01J 8/00
[52] U.S. Cl. .................... 423/239.1; 60/274; 60/301; 110/345
[58] Field of Search ............... 423/239.1; 110/345; 60/274, 301

[56] References Cited

U.S. PATENT DOCUMENTS

| | | | |
|---|---|---|---|
| 3,873,671 | 3/1975 | Reed et al. | 423/235 |
| 5,022,226 | 6/1991 | Bell | 60/274 |
| 5,224,334 | 7/1993 | Bell | 60/274 |

Primary Examiner—Ferris Lander
Assistant Examiner—Thomas G. Dunn, Jr.
Attorney, Agent, or Firm—Klauber & Jackson

[57] ABSTRACT

A process for treating an exhaust stream which includes high levels of noxious compounds containing chemically bound nitrogen, to produce an effluent stream that is extremely low in oxides of nitrogen and environmentally safe for discharge into the atmosphere. A source of oxygen and fuel is added to the exhaust stream to create a fuel-rich mixture, the quantity of fuel being sufficient to react with the available oxygen. The fuel-enriched stream is provided to a thermal reactor and reacted to provide a heated oxygen-depleted stream which includes quantities of by-product $NO_x$, which stream is then cooled to 800° to 1000° F. Conversion oxygen is added to the cooled stream which is then passed over a first catalyst bed under overall reducing conditions, the quantity of conversion oxygen added being in stoichiometric excess of the amount of $NO_x$ in the stream, but less than the amount of combustibles, whereby the $NO_x$ is first oxidized to $NO_2$, and then the $NO_2$ is reduced by the excess combustibles. The stream is cooled to a temperature of about 450° to 550° F., and air is added to produce a further cooled stream at a temperature of about 400° to 500° F., and having a stoichiometric excess of oxygen. This is passed over an oxidizing catalyst bed to oxidize remaining excess combustibles, and provide an effluent stream having environmentally safe characteristics.

17 Claims, 2 Drawing Sheets

HYBRID LOW NO$_x$ PROCESS FOR DESTRUCTION OF BOUND NITROGEN COMPOUNDS

FIELD OF THE INVENTION

This invention relates generally to the treatment of exhaust streams, and more specifically relates to an improved process for treating such streams to destroy contained noxious inorganic or organic compounds including chemically bound nitrogen, possibly in combination with one or more volatile organic compounds. The process achieves maximum destruction of the noxious compounds while ensuring extremely low levels of NO$_x$ in the final effluent vented to atmosphere.

BACKGROUND OF THE INVENTION

Numerous of the combustion processes incident to organic waste destruction generate as well as an undesired product, effluent gases having an unacceptable NO$_x$ content. More specifically, the high temperatures incident to the thermal destruction results in the fixation of some oxides of nitrogen. These compounds are found in the effluent gases mainly as nitric oxide (NO) with lesser amounts of nitrogen dioxide (NO$_2$) and only traces of other oxides. Since nitric oxide (NO) continues to oxidize to nitrogen dioxide (NO$_2$) in the air at ordinary temperatures, there is no way to predict with accuracy the amounts of each separately in vented gases at a given time. Thus, the total amount of nitric oxide (NO) plus nitrogen dioxide (NO$_2$) in a sample is determined and referred to as "oxides of nitrogen" (NO$_x$).

Such NO$_x$ emissions from stack gases, engine exhausts, etc., through atmospheric reactions, produce "smog"0 that stings eyes and may cause or contribute to acid rain. Other deleterious effects both to health and to structures are believed to be caused directly or indirectly by these NO$_x$ emissions. For these reasons, the content of oxides of nitrogen present in gases vented to the atmosphere has been subject to increasingly stringent limits via regulations promulgated by various state and federal agencies.

The Clean Air Act Amendments of 1990 (CAAA) will have a profound impact on sources that emit air toxics found in the new law's list of hazardous air pollutants. Completely restructuring the existing law, Congress has granted the U.S. Environmental Protection Agency (EPA) the authority to regulate hazardous emissions by categories of industry rather than individual pollutants and to develop control standards based on "maximum achievable control technology" (MACT) for each category. The geographic coverage of the control programs has also been greatly expanded. Using geographic designations, the new law seeks to regulate sources of nitrogen oxides (NO$_x$), volatile organic compounds (VOC), carbon monoxide (CO), and particulate matter (PM) based on five discrete categories for areas that do not meet National Ambient Air Quality Standards (NAAQS) for ozone.

A common prior art approach to destruct or prevent the formation of oxides of nitrogen in the treatment of exhaust streams that contain nitrogen-based compounds is to employ either thermal or catalytic processes. Thermal processes are effective in destruction of these compounds, but result in unacceptable levels of NO$_x$. The provisions of the cited new law present a real dilemma for facilities that have hazardous air pollutants in ozone non-attainment areas. If thermal treatment is applied as MACT, the result may actually be an increase in the level of NO$_x$, which is at odds with other provisions of the law requiring reductions in NO$_x$ and CO emissions.

The foregoing dilemma is in part illustrated by an existing situation, wherein a chemical manufacturing corporation operates a staged, thermal incineration unit. The system is based on a process disclosed in U.S. Pat. No. 3,873,671. The system utilizes "staged" combustion to destroy air toxics from two process vent streams in the manufacturing plant. The system, however, has not achieved satisfactory destruction efficiencies for hazardous air pollutants and emitted 250–450 ppmv NO$_x$. This staged combustion concept (see prior art FIG. 1) utilizes a first stage that is operated with an excess of fuel relative to available oxygen (O$_2$) to create a high temperature reaction zone in which hazardous air pollutants are thermally dissociated and NO$_x$ is reduced by the excess "combustibles", primarily carbon monoxide (CO) and hydrogen (H$_2$). This is followed by a cooling step in which recycled flue gas from the stack is mixed with the effluent from the first stage to reduce the temperature to 1400°–1600° F., a level which minimizes thermal NO$_x$ formation. After the cooling step, make-up air is added to provide the second combustion stage which is operated under "oxidizing" conditions at 1800°–2000° F. to convert the excess "combustibles" to normal products of combustion, carbon dioxide (CO$_2$), and water vapor.

This approach was introduced in the early 1970s and demonstrated that NO$_x$ reductions to levels in the range of 200–250 ppmv could be readily achieved. Although this two-stage method has been successfully applied to a number of applications requiring NO$_x$ reduction, it has several drawbacks. One is its limitation on the destruction of air toxics and CO that can be achieved. The other is the higher levels of excess fuel required to achieve adequate NO$_x$ reduction.

The vapor stream was being vented to the two-stage incinerator. The composition and flow rate are shown in Table I. There is sufficient oxygen in the stream to provide stable burning in the vortex burner of the incinerator. The unit required about 7.0 million Btu per hour of auxiliary fuel to react with the oxygen (O$_2$), hydrogen cyanide (HCN), CO, and NO$_x$ in the vent stream. In order to maximize NO$_x$ reduction, a minimum of 50% excess fuel is fired in the burner, bringing the total firing rate up to 10.50 Btu/hr. This results in a combustibles (CO and H$_2$) concentration of about 12.5% which is the driving force for NO$_x$ reduction.

TABLE I

| Vent Stream Flow and Composition | |
|---|---|
| Component | Stream (Vol. %) |
| N$_2$ | 58 |
| O$_2$ | 16 |
| CO$_2$ | 9 |
| CO | 2 |
| H$_2$O | 6 |
| NO | 5 |
| NO$_2$ | 4 |
| Flow (SCFM) | 1206 |

This high level of combustibles is advantageous for NO$_x$ reduction, but it can create some problems. First, the formation of CO and H$_2$ by the dissociation of CH$_4$ is an endothermic reaction and tends to lower the operating temperature in the reaction zone. Also, since the rate of reaction of the combustibles with the NO$_x$ is a function of temperature (as the temperature is lowered the reaction rate decreases), the lower temperature resulting from the dissociation of excess fuel somewhat offsets the benefit of the higher concentration of the reducing reactants (CO and $H_2$).

Second, the combustibles that leave the reduction section must be converted to products of combustion in the oxidation section. As the level of combustibles increases, more air and recycle to provide "burn out" of the combustibles and control of the oxidation chamber temperature are required. These high flow rates can result in a low residence time in the oxidation zone that is not sufficient to achieve the required level of CO oxidation.

The third potential problem with high excess fuel operation is the tendency to form HCN and $NH_3$ under reducing conditions. As the temperature is lowered and the excess fuel is increased, formation of these by-products is favored. This, coupled with low residence time in the oxidation section prevents adequate destruction of HCN and CO. The plant had experienced both high levels of CO (1300–1700 ppmv) and appreciable quantities of HCN (50–100 ppmv) in the stack gases which vent to the atmosphere. Although the high levels of HCN have been attributed to the fact that HCN (~200 ppmv) enters the staged, thermal incinerator in the vent stream and is probably not generated at these levels in the reduction chamber, the same conditions which lead to HCN formation also will lead to minimum HCN destruction. The high levels of CO in the stack are required to maintain $NO_x$ levels in the stack below 400 ppmv.

The chemical manufacturer is in an ozone non-attainment area and wanted to expand production. To process a permit for this expansion, $NO_x$ offsets, in addition to lowering the levels of CO and HCN in the vent from the two-stage incinerator, are being sought. Quantitatively, the chemical manufacturer wanted to achieve a 98% reduction in HCN, a 95% reduction in CO, and a 90% reduction in $NO_x$.

In the present applicant's U.S. Pat. Nos. 5,022,226 and 5,224,334, cogeneration processor and systems are disclosed which are particularly useful where internal combustion engines are employed as the primary power source, and which ensure extremely low $NO_x$ content in the final exhaust gases vented to ambient. Thus, in U.S. Pat. No. 5,022,226 patent, a cogeneration system is provided wherein fuel and oxygen are provided to an internal combustion engine connected to drive an electric generator, to thereby generate electricity. An exhaust stream is recovered from the engine at a temperature of about 500° to 1000° F. which includes from about 6 to 15 percent oxygen. Sufficient fuel is added to the exhaust stream to create a fuel-rich mixture, the quantity of fuel being sufficient to react with the available oxygen and reduce the $NO_x$ in the exhaust stream. The fuel-enriched stream is then provided to a thermal reactor means for reacting the fuel, $NO_x$ and available oxygen, to provide a heated oxygen-depleted stream. The oxygen-depleted stream is cooled in a heat exchanger. Prior to being passed over a catalyst bed under overall reducing conditions, conversion oxygen is added to the cooled stream. Such oxygen can be provided directly (i.e. as air), but preferably can be provided by bypassing part of the exhaust stream from the engine. The quantity of conversion oxygen is stoichiometrically in excess of the amount of $NO_x$ but less (stoichiometrically) than the amount of combustibles, in consequence of which NO in the stream is oxidized to $NO_2$ at the forward end of the bed, after which the $NO_2$ is reduced in the remainder of the bed by the excess combustibles. Air is added to the resulting stream from the catalytic bed to produce a cooled stream having a stoichiometric excess of oxygen, and the stream is passed over an oxidizing catalyst bed to oxidize remaining excess combustibles. The resultant stream, vastly reduced in $NO_x$ content can then be provided for venting. By means of the U.S. Pat. No. 5,022,226 invention, the $NO_x$ content can be reduced to less than 25 ppmv—often below 15 ppmv, while CO levels are also brought to well below 50 ppmv.

Pursuant to the U.S. Pat. No. 5,224,334 patent, it was found that the limiting factor for overall $NO_x$ reduction in the method and system of U.S. Pat. No. 5,022,226, is not as had previously been believed, the destruction of $NO_x$ in the reduction catalyst step. Essentially all of the $NO_x$ is reduced in this step, but apparently by-product ammonia is formed and is thereupon oxidized across the oxidation catalyst to reform $NO_x$. If, as taught in the U.S. Pat. No. 5,022,226, the oxidation catalyst step is operated at substantially the same temperature as that for the reduction catalyst (about 750°–1250° F.), 60–80% of the ammonia formed in the reduction step will be oxidized to reform $NO_x$. Pursuant to U.S. Pat. No. 5,224,334, however, it was found that by cooling the effluent stream from the reduction catalyst to about 400° to 600° F., and preferable to around 500° to 550° F. prior to the catalytic oxidation step, the oxidation of ammonia to form $NO_x$ is minimized. $NO_x$ levels are thereby reduced to remarkably low levels, typically below 5 ppmv.

SUMMARY OF INVENTION

Now in accordance with the present invention, it has unexpectedly been found that when the method of the aforesaid U.S. Pat. No. 5,224,334 is appropriately modified, the resulting process may be utilized in the treatment of exhaust streams including undesirably high levels of one or more noxious compounds containing chemically bound nitrogen, and will maximize the destruction of such compounds. The latter can comprise one or more oxides of nitrogen, organic compounds including bound nitrogen, or a mixture of one or more of the foregoing with one or more volatile organic compounds. By use of the invention an effluent stream results that is extremely low in oxides of nitrogen and is environmentally safe for discharge into the atmosphere.

Pursuant to the invention fuel and air (or other source of oxygen) are added to the exhaust stream to create a fuel-rich mixture, the quantity of fuel being sufficient to react with the available oxygen. The exhaust stream while most commonly being gaseous, can also be a liquid stream which is sprayed into a suitable chamber or conduit for intermixing with the fuel and air. The fuel-enriched stream is provided to an afterburner, and the fuel, chemically bound nitrogen compounds, or combination of the latter with volatile organic compounds, and available oxygen are reacted to provide a heated oxygen-depleted stream which includes quantities of by-product $NO_x$. The oxygen-depleted stream is cooled in a first heat exchanger to between 800° to 1000° F. Conversion oxygen is admixed with the cooled stream, which is then passed over a catalyst bed under overall reducing conditions. NO is converted to $NO_x$ at the forward end of the bed, and the $NO_2$ then reacts on the remainder of the bed with excess combustibles. The stream from the reducing catalyst bed is cooled from a temperature of 950° to 1250° F., to about 450° to 550° F. and air is added to produce a further cooled stream at 400° to 500° F. having a stoichiometric excess of oxygen, and the further cooled stream is passed over an oxidizing catalyst bed to oxidize remaining combustibles. The resultant stream which is low in chemically bound nitrogen, oxides of nitrogen or a combination of organic compounds and oxides of nitrogen, can then be provided for venting.

In accordance with the foregoing, it may be regarded as an object of the present invention, to provide a method for the treatment of process exhaust streams which include undesired chemically bound nitrogen, such as oxides of nitrogen and/or organic compounds with bound nitrogen, together with possible VOC's and which is effective to maximize the destruction of all of same, to produce an exhaust stream that is extremely low in oxides of nitrogen and is environmentally safe for discharge into the atmosphere.

It is another object of the invention to provide a method of the foregoing character which is effective in treating such exhaust streams, even where the $NO_x$ and/or bound nitrogen compound and/or VOC content is extremely high, e.g. 50 to 100%.

BRIEF DESCRIPTION OF THE DRAWINGS

The invention is diagrammatically illustrated, by way of example, in the drawings appended hereto, in which.

DETAILED DESCRIPTION OF PREFERRED EMBODIMENTS

Figure 2:
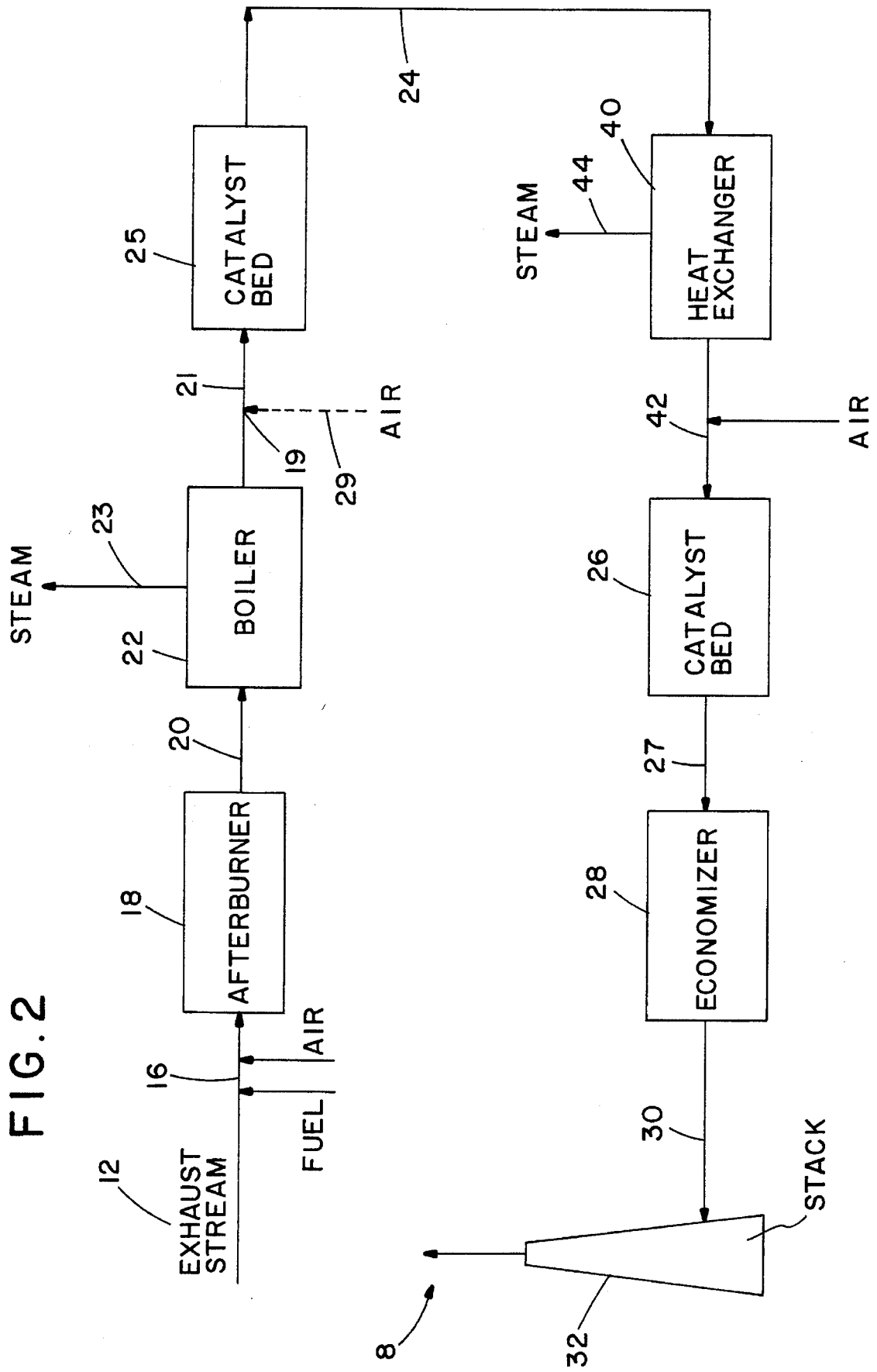
FIG. 2 is a schematic block diagram illustrating a system operating in accordance with the invention, in the course of treating a process exhaust stream.

Referring now to FIG. 2, a system 8 is shown in the course of treating an exhaust process stream 12 pursuant to the invention. The input stream 12 can for illustration be regarded as gaseous, as for example an exhaust stream from an industrial process. Stream 12 can be at typical temperatures ranging from ambient to about 500° F. The stream can typically contain from about 0–21% by volume $O_2$; from low concentrations measured in ppm's, essentially as low as zero, up to 100% by volume of $NO_x$; from low concentration measured in ppm's, essentially as low as zero, up to 100% by volume of organic compounds including bound nitrogen (e.g. ammonia, volatilized amines, DNB, or of other nitrogen-containing aromatic or aliphatic compounds, etc.), together with low concentrations measured in ppm's, essentially as low as zero, up to 100% by volume of additional VOC's such as BTEX compounds. The stream can also include particulate matter in the form of soot. Fuel and air (or other source of oxygen) are introduced into duct 16 carrying stream 12, to be admixed with the exhaust stream. The added fuel can be any hydrocarbon fuel such as distillate oils, diesel oil, propane, natural gas, naphtha, and the like; natural gas is preferred. The amount of fuel added is selected to be sufficient to subsequently react with the available oxygen and reduce the $NO_x$ in the exhaust stream. In general from about 1 to 50% stoichiometric excess fuel is used with a preferable excess being from about 5 to 10% stoichiometrically relative to the available oxygen. Thus, the exhaust stream 12 is treated, i.e. has fuel and air added to it, to produce a fuel-rich fuel-air mixture containing 1% to 50% excess of fuel over the oxygen stoichiometrically present.

The thus-treated exhaust stream is then passed to a thermal reactor, i.e., an afterburner 18, wherein it is burned at a temperature of about 1400° to 2000° F. A residence time of about 0.25 to 0.5 seconds is required to ensure that the desired essentially complete burn-out of oxygen in the stream and reduction of a portion of the chemically bound nitrogen will occur. A greater residence time can be employed, e.g., 1 second or more, but serves no useful purpose—while increasing the costs of operation.

The gaseous effluent from afterburner 18 typically includes some unreacted chemically bound nitrogen and oxides of nitrogen ($NO_x$). Its oxygen content is close to zero. The amount of fuel and air added at 16 will generally be such as to leave about 0.5 to 2% of CO and $H_2$ in the effluent at 20. Such stream is then passed to and through a first heat exchanger, which may comprise a waste-heat boiler 22 wherein the effluent is cooled to a temperature of about 800° to 1000° F. It is necessary that the lower end of this range be at or above the cited 800° F., because of the presence of the bound nitrogen compounds. At lower temperatures additional compounds of nitrogen could be generated which could be converted to $NO_x$. The heat content in the stream is thus extracted at boiler 22 to produce steam, which can be removed via line 23 and used for space heating or the like; while at the same time the stream has been cooled, which is a central consideration for its subsequent treatment.

The fuel-enriched and cooled gas from boiler 22, prior to being passed to and through a catalyst bed 25, is admixed with a controlled amount of conversion oxygen, added into duct 21 at point 19. The primary purpose of the conversion oxygen is realized upon the mixture entering catalyst bed 25.

In particular, the amount of conversion oxygen added to the cooled stream from boiler 22 is such as to be (stoichiometrically) in excess of the amount of $NO_x$ in such stream, but less (stoichiometrically) then the amount of combustibles (chiefly fuel) in the stream. Typically the amount of oxygen added is about 0.2 to 0.9%. Bearing in mind that the $NO_x$ in line 21 is chiefly in the form of NO, as the mix enters the front end of the catalyst bed 25, the $O_2$ reacts with the NO to predominantly convert same to $NO_2$. The latter, being more unstable and reactive than NO, is then readily reduced to innocuous compounds by the excess combustibles as the flow proceeds through the remainder of the bed. To be appreciated is that the effective action described is facilitated if not enabled by the fact that the process stream has indeed been cooled by boiler 22. Were the gas stream in duct 21 at an elevated temperature, the initial conversion of NO to the more reactive $NO_2$ would not proceed to the extent necessary to enable the action just described—i.e., such high temperatures would favor disassociation of $NO_2$ back into the more stable form of NO.

The overall reaction in bed 25 is therefore seen to be a reducing one wherein the fuel-rich stream at a temperature of about 800° to about 1000° F., is passed into bed 25 and over a reducing catalyst, e.g. platinum-rhodium in the zero-valent state supported on a carrier such as alumina, silica or a metal alloy. The making of such catalysts is well known to persons skilled in the art and known noble metal catalysts such as blends of Pd, Pt and Rd can be used, as well as MnO and other metal oxides. There can be in the familiar pellet, ribbon, honeycomb or other forms. Catalyst volumes will vary depending on the particular catalyst used. Ordinarily, the quantity of catalyst and the flow rate are such that the space velocity is typically in the range of 30,000 to 60,000 hr.$^{-1}$, typically being about 40,000 hr.$^{-1}$. The reaction recurring at bed 25 is exothermic whereby the gas stream exiting in conduit 24 has been heated by a typical 150° F. or more as compared to its temperature going into the bed. Its temperature as it leaves bed 25 and enters conduit 24 is typically in the range of 950° to 1250° F. At this temperature chemically bound nitrogen compounds are dissociated and react with excess CO and $H_2$ to form preferentially $CO_2$, $H_2O$ and $N_2$.

The stream exiting from catalyst bed 25 in conduit 24 is found as a result of the foregoing actions to be very low in $NO_x$, typically including under 15 ppmv of same. However, the CO content is typically about 500–2000 ppmv.

At one time it was believed that little if any $NO_x$ precursors such as $NH_3$ were formed in catalyst bed 25. It has now been established, however, that while essentially all of the $NO_x$ is reduced in this step, by-product ammonia or other chemically bound nitrogen compounds are formed and can be oxidized during subsequent treatment across the oxidation catalyst bed 26, if the oxidation catalyst step is at substantially the same temperature as at the reduction catalyst bed 25. Accordingly, the stream in conduit 24, at a temperature of 950°–1250° F., is passed to a heat exchange 40 where indirect heat exchange with a cooling media reduces the stream temperature at output conduit 42 to the range of 450° to 550° F., and preferably to about 500°. The cooling medium for heat exchanger 40 preferably comprises water, so that the extracted heat can convert the water to stream, which can then be conducted by a conduit 44 to supplement the steam output 23 from boiler 22. Alternatively the cooling water for heat exchanger 40 can be heated to a lower temperature and then used as feed water for boiler 22.

Air 43 is now introduced into the stream in conduit 42, which, among other things, further cools the gas stream. The resulting gaseous stream at a temperature of 400° to 500° F. is passed to a further catalyst bed 26 wherein the gas stream is passed over an oxidizing catalyst. The upper limit of 500° F. is important in the present invention to avoid generation of oxides of nitrogen from the oxidation of chemically bound nitrogen compounds. The amount of air added relative to the stream in conduit 42 is such that the resulting stream will contain oxygen stoichiometrically in excess of the amount needed to burn any unreacted chemically bound nitrogen compounds which may be present in the stream, and will preferably be controlled so that the $O_2$ content in conduit 27 downstream of bed 26 will be about 1.5 to 3%. Either noble metal catalysts, such as platinum, palladium, or rhodium; or base metal oxides, such as copper oxide, chrome oxide, or manganese oxide, or the like, may be used for this purpose. The noble metal catalysts, e.g., platinum or palladium catalysts, are most suitably the noble metals deposited in the zero valent state upon a support, such as alumina, silica, kiesel-guhr, or a metal alloy, and the like. The metal oxide catalysts are also most suitably the metal oxides supported on supports of this character. Various shapes such as pellets, ribbons or honeycombs can be used. The making of such catalysts is well known to persons skilled in the art. Catalyst volumes will vary depending on the particular catalyst used. Ordinarily, the quantity of catalyst and the flow rate are such that the space velocity is generally in the range of 40,000 to 80,000 $hr.^{-1}$—60,000 $hr.^{-1}$ is a typical value.

Figure 1:
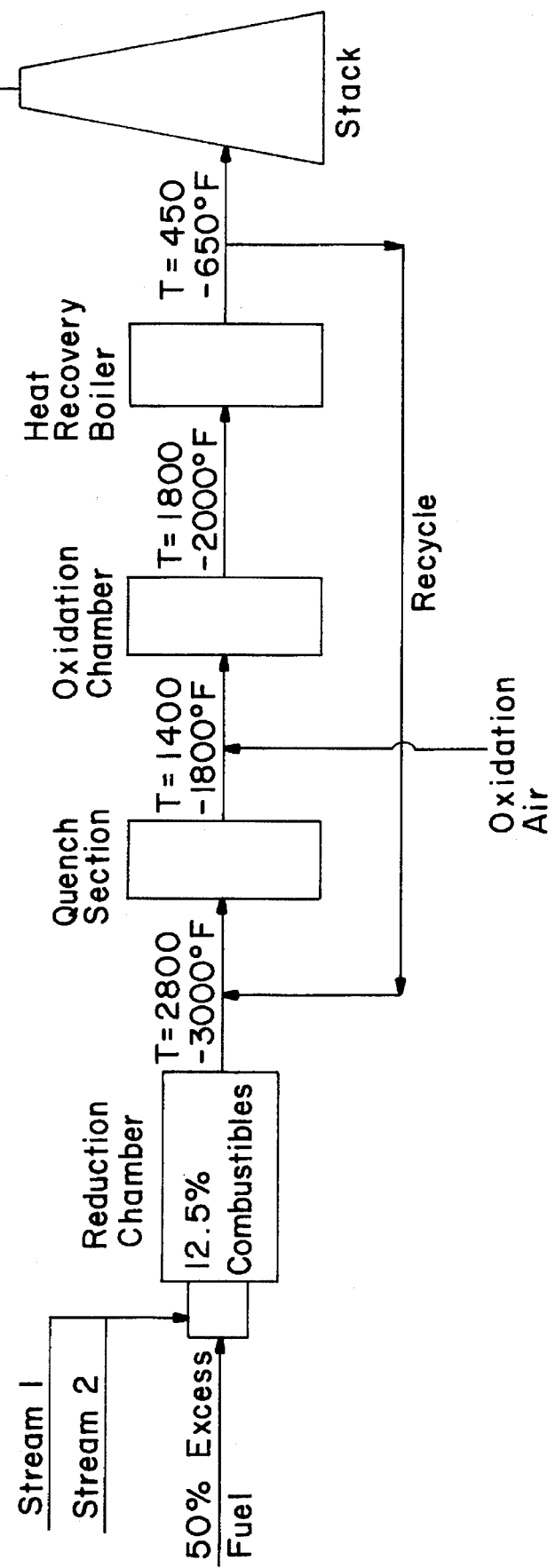
FIG. 1 is a schematic block diagram illustrating a prior art system which utilizes staged thermal combustion to destroy air toxics from process vent streams in a manufacturing plant.

A comparison of the two-stage thermal system of FIG. 1 and the Hybrid Low $NO_x$ operation described in FIG. 2 is presented in Table II.

TABLE II

| Comparison of Two-Stage, Thermal System with Hybrid Low $NO_x$ Operation | | |
|---|---|---|
| | Two-Stage Thermal | Hybrid Low $NO_x$ |
| Fuel, Btu/hr | 10.22 | 7.49 |
| Recycle, SCFM | 4410 | 3290 |

TABLE II-continued

| Comparison of Two-Stage, Thermal System with Hybrid Low $NO_x$ Operation | | |
|---|---|---|
| | Two-Stage Thermal | Hybrid Low $NO_x$ |
| Oxidation Air, SCFM | 800 | 320 |
| $NO_x$ Emissions ppm | 250–450[1] | 25–50[2] |
| CO Emissions ppm | 1300–1700[1] | 15–25[2] |
| HCN Emissions ppm | 50–100[1] | 5–10[2] |
| VOC Emissions ppm | 75–150[1] | 5–10[2] |

[1]Measured emissions of two-stage thermal system
[2]Measured emissions of hybrid low $NO_x$ process While the principle purposes of the invention have been achieved in the gas stream in conduit 27, additional operations may be desired to obtain yet further advantages from the invention. The oxidized gaseous effluent from the bed 26 is thus shown passing from conduit 27 to an economizer or a low-pressure, waste-heat boiler, or the like, indicated at 28. Here the heat content of the oxidized gaseous effluent is extracted to the maximum amount economically feasible. The cooled gas at a temperature of about 300°–400° F. is then discharged through an outlet conduit 30 into a stack 32 and vented to the atmosphere with the assurance that the vented effluent will comply with emission standards. It will have a $NO_x$ content of generally less than 5 ppmv and a CO content of less than 50 ppmv, more generally being in the range of 25 to 50 ppmv.

It will, of course, be understood in the foregoing description, that reference to the afterburner, boiler, waste-heat boiler, economizer, gas treatment unit, and the like, contemplates utilization of standard equipment well known to persons skilled in the art. The catalyst beds, for example, can be any containers adapted for gas passage and containing an appropriate redox catalyst of a type well known in this art.

It will be understood in view of the foregoing disclosure, that various changes may now be made by those skilled in the art without yet departing from the invention as defined in the appended claims; and it is intended, therefore, that all matter contained in the foregoing description and in the drawing shall be interpreted as illustrative and not in a limiting sense.

What is claimed is:

1. A process for treating an exhaust stream which includes one or more noxious compounds containing chemically bound nitrogen, to produce an effluent stream that is reduced in oxides of nitrogen for discharge into the atmosphere; said process comprising:

adding to said exhaust stream a source of oxygen and sufficient fuel to create a fuel-rich mixture, the quantity of fuel being sufficient to react with the available oxygen;

providing said fuel-enriched stream to a thermal reactor and reacting therein said fuel, noxious compounds, and available oxygen, to provide a heated oxygen-depleted stream which includes by-product chemically bound nitrogen compounds;

cooling said oxygen-depleted stream to 800° to 1000° F. by passing same through a first heat exchanger;

adding conversion oxygen to said cooled stream from said first heat exchanger, and passing the cooled oxygen-augmented stream over a first catalyst bed under overall reducing conditions, the quantity of conversion oxygen added being in stoichiometric excess of the amount of chemically bound nitrogen in said stream, but less than the amount of combustibles; whereby the bound nitrogen is first dissociated and oxidized to $NO_2$, and then the $NO_2$ is reduced by the excess combustibles;

cooling said stream from said first catalyst bed to a temperature of about 450° to 550° F. by passing said stream through a second heat exchanger;

adding air to the resulting cooled stream to produce a further cooled stream at a temperature of about 400° to 500° F., and having a stoichiometric excess of oxygen; and passing said stream having said stoichiometric excess of oxygen over an oxidizing catalyst bed at said temperature of 400° to 500° F. to oxidize any unreacted chemically bound nitrogen compounds, to thereby provide an effluent stream for discharge.

2. A method in accordance with claim 1, wherein said noxious compounds include one or more oxides of nitrogen.

3. A method in accordance with claim 2, including $NO_x$ in the range of up to 100% by volume of said exhaust stream.

4. A method in accordance with claim 1, wherein said noxious compounds include HCN.

5. A method in accordance with claim 1, wherein said noxious compounds include $NH_3$.

6. A method in accordance with claim 1, wherein said noxious compounds include organic compounds with bound nitrogen.

7. A method in accordance with claim 1, wherein said exhaust stream further includes one or more VOC's.

8. A method in accordance with claim 1, wherein said exhaust stream is gaseous.

9. A method in accordance with claim 1, wherein said exhaust stream is liquid.

10. A method in accordance with claim 1, wherein the resultant stream from said oxidizing catalyst bed is provided for venting.

11. A method in accordance with claim 10, further including recovering heat from the effluent from the oxidizing catalyst prior to said venting.

12. A method in accordance with claim 1, wherein the reaction in said thermal reactor is conducted at a temperature range of from about 1400° to 2000° F.

13. A method in accordance with claim 1, wherein the amount of fuel added to said stream provides a stoichiometric excess of fuel of up to 150% with respect to available oxygen.

14. A method in accordance with claim 13, wherein the excess fuel is in the range of 105 to 110%.

15. A method in accordance with claim 11, wherein the residence time in said thermal reactor is from about 0.25 to 0.5 seconds.

16. A method in accordance with claim 1, wherein said first heat exchanger is a steam boiler, and further including converting a portion of the heat energy of the stream from said first catalyst bed into steam at said second heat exchanger, for supplementing the steam from said boiler.

17. A process in accordance with claim 1, wherein the space velocity of said resultant stream passing over said oxidizing catalyst is about 60,000 to 80,000 $hr.^{-1}$.

\* \* \* \* \*